A. T. Jones,
Windlass Water Elevator.
Nº 54,557. Patented May 8, 1866.
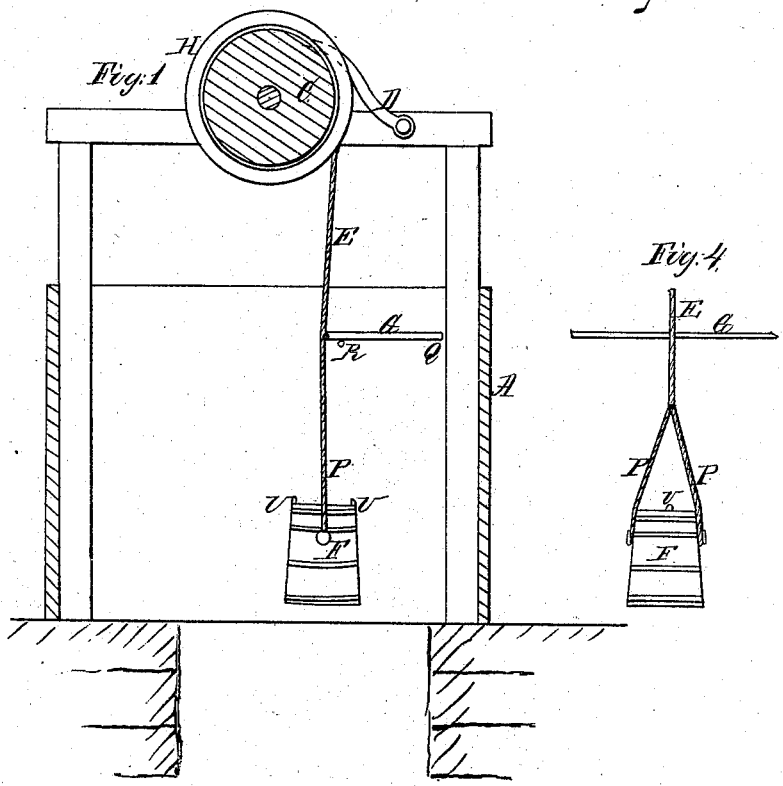
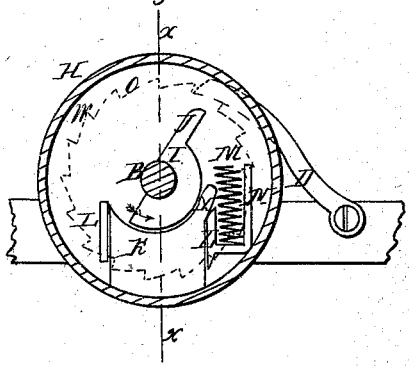
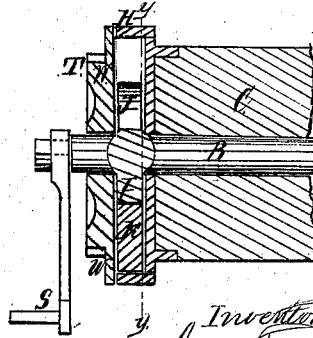

UNITED STATES PATENT OFFICE.

A. T. JONES, OF STAMFORD, CONNECTICUT.

IMPROVEMENT IN WATER-ELEVATORS FOR WELLS.

Specification forming part of Letters Patent No. 54,557, dated May 8, 1866.

*To all whom it may concern:*

Be it known that I, A. T. JONES, of Stamford, Fairfield county, and State of Connecticut, have invented a new and useful Improvement in Water-Elevators; and I do hereby declare that the following is a full, clear, and exact description thereof, which will enable others skilled in the art to make and use the same, reference being had to the accompanying drawings, forming part of this specification, in which—

Figure 1 shows, in section, an elevation of a well-curb or well-house in which my invention is applied. Fig. 2 is a view of the box on the end of the drum and shaft, taken on the line $y$ of Fig. 3. Fig. 3 is an axial section of the drum and of the box on the drum on the line $x$ of Fig. 2. Fig. 4 shows my improved bail.

Similar letters of reference indicate like parts.

This invention relates to water-elevators applied in open wells in conjunction with buckets suspended in such wells from a rope or chain.

It consists, among other things, in a novel way of making the bails of such buckets; also, in a novel way of constructing and operating the parts which rotate the drum, so that the latter can be made to rotate with the shaft and can be released, so as not to be acted on by the shaft, and can also be restrained, as by the action of a brake, from turning under the weight of the bucket.

A designates a well-curb, on the upper part of which is mounted a shaft, B, having a crank, S, at each end thereof. C is a drum fitted loosely on the shaft, and having at one end a hollow box, H. The outer end, W, of this box is loosely fitted to it, and has a series of ratchet-teeth formed upon it, which are engaged by a detent, D, that is pivoted to the upper part of the curb. The cover W is loose on the shaft, as well as the drum. A rope, E, is fastened by one end to the drum, the other end being connected to the upper end of a flexible bail, P, whose divisions V V are attached to the sides of the bucket F some way down its sides. Pins U U, projecting upward from the edge of the bucket on opposite sides, take hold of a tilting frame, G, whose ends Q turn in opposite sides of the curb. The sides of the bail rest on pins R, which extend from the inside of the curb, so as to prevent it from falling below a horizontal position.

From the manner above shown of constructing the bail of the bucket it results that whenever, in winding the rope on the drum, the end of the rope is reached the diverging sides or divisions V V of the bail will adjust themselves on the drum so as to bring the bucket to the position seen in Fig. 1, and present one of its pins U below the loop of the frame or bail G, in readiness to engage it when the bucket reaches it. The flexible bail will be wound around the drum, the same as the rope itself, and yet, when so wound, will cause the bucket to be righted, so that one or the other of its pins U will be brought beneath the frame or bail G. The frame or bail G will be carried upward by the bucket, and the latter will be brought toward the front of the curb, being tilted at the same time by reason of the engagement of its hook with the frame or bail G.

The shaft B has a crank, S, at each end, to enable the elevator to be operated from opposite sides of the well when a well is on a division-line or when, for any other reason, the elevator is to be worked from either side.

When the detent D engages the ratchet of the loose cover W the latter is held stationary, although the drum may be left free to revolve. On the inner side of the cover W are two parallel guides, L L, which hold a friction-block, K, whose thickness is about equal to the depth of the box. Its inner and outer edges are curved concentrically, its outer edge serving to make the box H and cover W move together when the block is held snugly against the inner circumference of the box and the cover W is rotated. The right-hand horn of the block is extended, as at J, so as to reach above the guide L on that side.

N designates a socket formed on the inner side of the cover W, at the right-hand side of the place of the block K when one is observing Fig. 2, for the purpose of holding a spring, M, which, in its normal state, reaches above the top of the horn X. The spring M, like the block K, is held between the cover W and the inner face of the box H. The shaft has fixed on that part of it which passes through the box a curved cam, I, which fits within the inner edge of the block K. The smallest radius of the cam is on the right-hand side of the shaft to one who is observing Fig. 2. A finger, J, extends toward the right from the end of that part of the cam which is of the least radius, observing Fig. 2, the office of which finger is to produce friction on the box H, and by that means control the drum when it is turning in a direction to lower the bucket. When the shaft is turned in the direction of the arrow in Fig. 2, the enlarged part of the cam comes in contact with the block and crowds it outward against the inner circumference of box H, and consequently communicates motion to the drum. A continuation of the rotation in this direction will bring the bucket up to the top of the well. When the shaft is turned a little way in a contrary direction the block is released, and if the weight of the bucket or rope comes on the drum the latter, being left free from the block, will turn in the opposite direction and allow the bucket to descend to the bottom of the well. This latter motion can be checked by means of the finger J and horn X when the shaft is turned so far in a direction contrary to that in which the arrow points as to bring the finger on the top of the horn, in which case the block will again be crowded against the box and the rotation of the drum will be checked or stopped, according to the force exerted on the end of the horn. Before the finger can reach the horn it meets the spring M and compresses it in its socket. When the shaft is released the spring immediately raises the finger from off the horn and restores the cam to a position where it can act on the block and arrest the descent of the bucket.

It will be observed that, owing to this construction, the elevator can be operated from either end of the shaft, the cam which actuates the drum, both to raise the bucket and to check its descent, being placed on the shaft, and consequently moving with it.

Having thus described my invention, I claim as new and desire to secure by Letters Patent—

1. Rotating the drum of a water-elevator by means of a cam on the crank-shaft acting on a radial-moving friction-block placed within a box on one end of the drum, constructed and operating substantially as described.

2. The finger J of the cam I, in combination with the horn X of the friction-block K, for the purpose of arresting the descent of the bucket, substantially as described.

3. The socket N within the box H of the drum, in combination with a spring, M, for the purpose of bringing the cam I into action against the block, substantially as described.

A. T. JONES.

Witnesses:
M. M. LIVINGSTON,
C. L. TOPLIFF.